July 24, 1951  J. J. DIGBY  2,561,977
ENGINE STARTER DRIVE
Filed Jan. 30, 1950  2 Sheets-Sheet 1

WITNESS:
Esther M. Stockton

INVENTOR.
James J. Digby
BY
Clinton S. James
ATTORNEY

July 24, 1951   J. J. DIGBY   2,561,977
ENGINE STARTER DRIVE
Filed Jan. 30, 1950   2 Sheets-Sheet 2

WITNESS:
Esther M. Stockton

INVENTOR.
James J. Digby
BY
Clinton S. Janes
ATTORNEY

Patented July 24, 1951

2,561,977

UNITED STATES PATENT OFFICE 2,561,977

ENGINE STARTER DRIVE

James J. Digby, Elmira, N. Y., assignor to Bendix Aviation Corporation, a corporation of Delaware Application January 30, 1950, Serial No. 141,295

5 Claims. (Cl. 74—7)

The present invention relates to an engine starter drive, and more particularly to a drive of the so-called "anti-kickout" type which maintains its mechanical connection with the engine as long as the starting motor is energized.

It is an object of the present invention to provide a starter drive of the above type which is efficient and quiet in operation, and simple in construction.

It is another object to provide such a device which includes a positive type of overrunning clutch connection, and means for causing the connection to overrun freely and quietly.

It is another object to provide such a device incorporating means for limiting the torque loads transmitted thereby.

Further objects and advantages will be apparent from the following description taken in connection with the accompanying drawing in which Fig. 1 is a side elevation partly broken away and in section showing a preferred embodiment of the invention with the parts in idle position;

Figure 1:
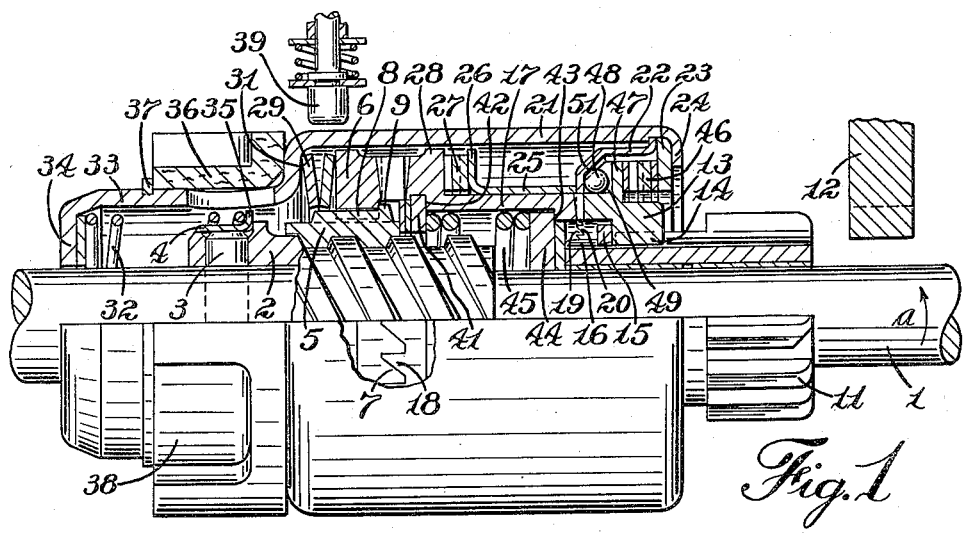

In Fig. 1 of the drawing there is illustrated a power shaft 1 on which a screw shaft 2 is anchored by suitable means such as a cross pin 3 retained therein by a thimble 4.

A control nut 5 is threaded on the screw shaft 2, and a driving coupling member 6 having inclined driving surfaces 7 is splined on the control nut as indicated at 8, and normally rests against shoulders 9 formed on the control nut 5.

A pinion 11 is slidably journalled on the power shaft 1 for longitudinal movement into and out of mesh with a gear 12 of the engine to be started.

A driven overrunning clutch member 13 is splined on the pinion 11 as indicated at 14, and a lock ring 15 seated in the extended hub 16 of the pinion 11 limits the projection of the pinion from the driven clutch member 13.

A transmission sleeve member 17 is arranged to connect the driving coupling member 6 to the driven clutch member 13, and for this purpose is provided with inclined surfaces 18 adapted to cooperate with the inclined surfaces 7 of the driving coupling member, and with driving overrunning clutch teeth 19 arranged to cooperate with similar teeth 20 on the driven clutch member.

A barrel member 21 surrounds the coupling and clutch members, and a sleeve 22 is fixedly mounted in one end thereof as by means of a washer 23 and a retaining flange 24. A second sleeve 25 is mounted on the transmission member 17 within the barrel and abuts at one end against the end of the sleeve 22. The other end of the sleeve 25 is flared outwardly to form a radial flange 26, and a compression spring 27 is located between the flange 26 and a corresponding flange 28 on the transmission member 17 so as to cooperate with the sleeves 22, 25 to form yielding thrust means urging the transmission member toward the driving coupling member 6, and tending to separate the overrunning clutch members 13 and 17 during high speed overrun of the pinion and clutch assembly 13 and 11.

A heavy short compression spring here shown in the form of a pair of elastic discs 29 is interposed between the driving coupling member and an internal shoulder 31 formed in the barrel so as to strongly resist movement of the driving coupling member 6 toward said shoulder.

Figure 2:
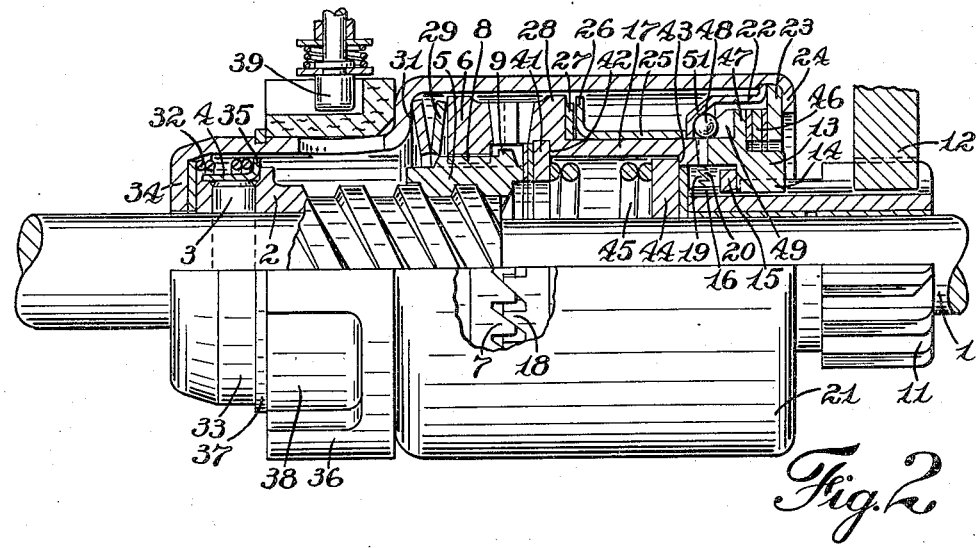
Fig. 2 is a similar view showing the parts in meshed position preparatory to cranking operation.

An anti-drift spring 32 is located in the reduced portion 33 of the barrel 21 and bears at one end against an inwardly extending flange 34 at the end of the barrel and at its other end against a radial shoulder 35 formed on the thimble 4 so that the spring 32 forms yielding means for withdrawing the barrel and its associated parts from meshed position. A ring 36 of fiber or other suitable material is seated on the reduced portion 33 of the barrel against the shoulder 31, and is retained in position by a lock ring 37 while being free to rotate on the barrel. The ring 36 is provided with recesses or pockets 38 adapted to receive the end of a spring-pressed plunger 39 connected to the starting switch which controls the energization of the drive, so as to be projected into position to enter one of said pockets when the drive is in meshed position as illustrated in Fig. 2.

A thrust bearing 41 in the form of one or more annular thrust rings is interposed between the end of the control nut 5 and a shoulder 42 formed in the interior of the transmission member 17. The transmission member is provided with a second thrust shoulder 43 located adjacent the end of the pinion 11, and an abutment ring 44 is slidably mounted within the transmission member 17, normally seated against the shoulder 43. A compression spring 45 in the transmission member 17 bears at its ends against the thrust bearing 41 and abutment ring 44 so as to form therewith a yielding abutment for the pinion to resist its telescopic movement into the transmission member.

Means for yieldingly holding the driven overrunning clutch member 13 in engagement with the clutch teeth 19 of the transmission is provided in the form of a light compression spring 46 located between the washer 23 and a flange 47 extending radially from said driven clutch member.

Centrifugal means for moving the driven clutch member out of engagement with the transmission member when the pinion overruns the drive is provided in the form of a plurality of balls 48 located in pockets 49 in the driven clutch member 13 and arranged to cooperate with inclined surfaces 51 formed in the sleeve 22 so that when the balls move radially outward by centrifugal force they serve to cam the driven clutch member away from the transmission member and hold the teeth 19, 20 out of engagement.

In the operation of this embodiment of the invention, and starting with the parts in the positions illustrated in Fig. 1, actuation of the power shaft 1 by the starting motor, not illustrated, causes it to rotate in the direction of the arrow "a," whereby the consequent rotation of the screw shaft 2 causes the nut 5 to be traversed to the right, which longitudinal movement is transmitted through the thrust bearing 41 to the transmission member 17; and through the mesh enforcing spring 45 and thrust ring 44 to the pinion 11, causing it to enter into mesh with the engine gear 12 as shown in Fig. 2. The longitudinal movement of the transmission member 17 is transmitted through the spring 27 and thrust sleeves 25, 22 to the barrel member 21, until the longitudinal movement of the assembly is arrested by engagement of the flange 34 of the barrel against the adjacent end of the screw shaft 2. Further rotation of the screw shaft causes rotation of the driving coupling member 6, which causes the inclined surfaces thereof to cam the transmission member 17 to the right, compressing the spring 27 and also forcing together the overrunning clutch teeth 19, 20 after the spring 46 has been completely compressed, as illustrated in Fig. 2. Thereafter, torque is transmitted through the coupling and clutch members to the pinion to crank the engine, excessive shock loads causing the inclinded surfaces 7, 18 of the coupling members to slide over each other so as to yieldingly prevent damage to the drive.

Figure 3:
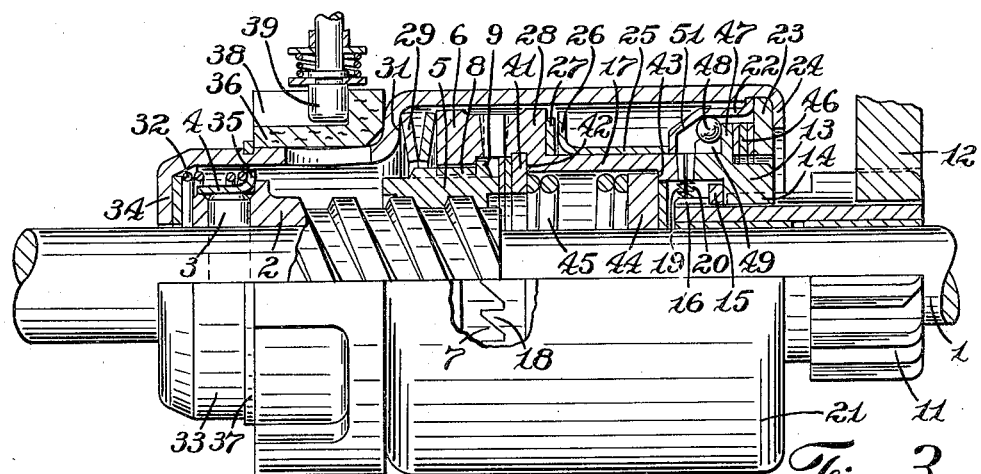
Fig. 3 is a view similar to Fig. 1 showing the parts in the position assumed after the engine becomes self-operative, while the drive is still energized.

When the engine starts, the rapid acceleration of the pinion 11 by the engine gear 12 causes clutch teeth 20, 19 to overrun, while the transmission member 17 moves back a short distance until its travel is arrested by the plunger 39 engaging in pocket 38 of ring 36, as illustrated in Fig. 3. If the engine continues self-operative, the rapid rotation of the pinion 11 causes the balls 48 to move radially outward and hold the overrunning clutch teeth 19, 20 out of engagement as shown in Fig. 3 so that the overrunning takes place quietly and without excessive generation of heat. When the operator opens the starting switch, the plunger 39 is withdrawn from engagement with the ring 36, whereupon the drive returns to idle position under the influence of the anti-drift spring 32 and the overrunning action of the control nut 5 on the screw shaft 2.

Figure 4:
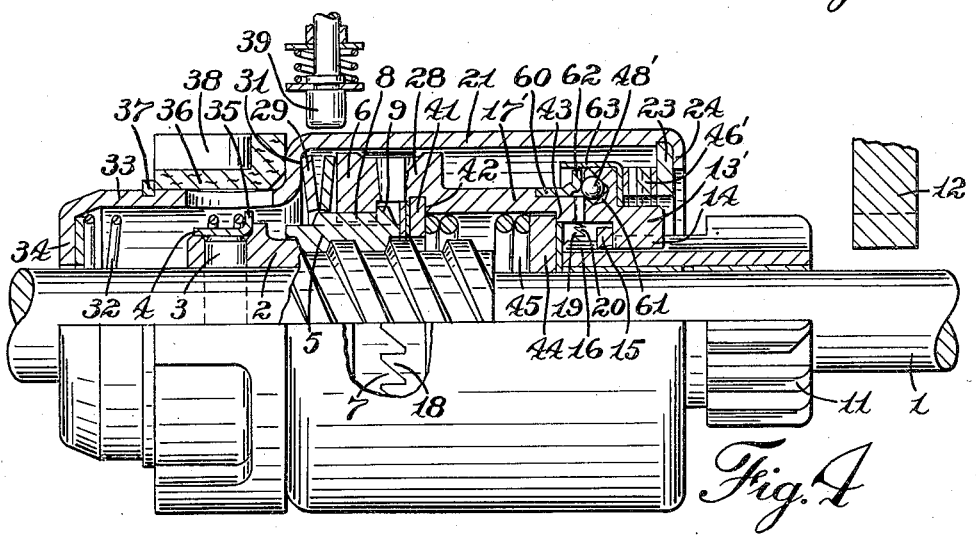
Fig. 4 is a view similar to Fig. 1 of a second embodiment of the invention.

In the embodiment of the invention illustrated in Fig. 4 the parts are substantially the same as in the first embodiment described, and are similarly numbered with the exception of the means for controlling the longitudinal positions of the transmission and driven overrunning clutch members.

As there shown, the transmission member 17' has a flanged ring 60 fixed thereon, while the driven overrunning clutch member 13' is provided with cylindrical pockets 61 which are inclined to the axis of the drive, and slidably receive the centrifugal balls 48'. When the balls move outwardly under the action of centrifugal force, they engage the flange 62 of the ring 60 so as to move the driven clutch member 13' away from the transmission member 17', compressing the clutch spring 46'. The radial movement of the balls 48' is limited by a thimble 63 mounted on the clutch member 13' and surrounding the pockets 61 and the flange 62 of the ring 60.

The operation of this embodiment of the invention is the same as that previously described except for the fact that the centrifugal balls in this case act directly against the transmission member 17' instead of against the thrust sleeve 22 connected to the barrel 21, thus positively holding the corresponding clutch teeth of 17' and 13' apart during overrunning of the pinion and clutch assembly. The spring 27 and thrust sleeve 25 illustrated in the first embodiment of the invention are thus rendered unnecessary, the function of the spring 27 being performed by the clutch spring 46'.

A further advantage of this arrangement is that the balls 48' and the thimble 63 which limits the outward travel of the balls are both attached to the clutch, hence they are rotating at the same speed during overrun and there is no relative movement between them with consequent absence of friction, wear, and heat which would result if thimble and balls were moving relative to each other during overrun as in the design shown in Fig. 3.

Although two embodiments of the invention have been shown and described in detail, it will be understood that other embodiments are possible and changes may be made in the design and arrangement of the parts without departing from the spirit of the invention.

I claim:

1. In an engine starter drive a power shaft, a screw shaft fixed thereon, a control nut threaded on the screw shaft, a driving coupling member having inclined torque-transmitting surfaces splined on the control nut, a pinion slidably journalled on the power shaft for longitudinal movement into and out of mesh with a gear of the engine to be started, a driven overrunning clutch member splined on the pinion, a transmission member comprising driven coupling means cooperating with the driving coupling member and driving overrunning clutch means cooperating with the driven clutch member; a barrel member enclosing the coupling and clutch members having an inturned shoulder, a spring in the barrel bearing against said internal shoulder and the driving coupling member so as to force the latter against the transmission member, thrust means in the barrel limiting longitudinal movement of the driven clutch member toward the engine gear including a compression spring, and a thrust bearing transmitting the longitudinal movement of the control nut to the transmission member.

2. An engine starter drive as set forth in claim 1 including further, abutment means mounted on the transmission member including a sleeve anchored to the barrel, and a spring cooperating with the abutment means and the transmission member to urge the latter into engagement with the driving coupling member.

3. An engine starter drive as set forth in claim 2 including further, centrifugal means for moving the driven clutch member away from the transmission member.

4. An engine starter drive as set forth in claim 2 in which the transmission member is provided with an internal shoulder adjacent the end of the pinion, an abutment ring slidably mounted in the transmission member, a compression spring in the transmission member bearing at its ends against said thrust bearing and abutment ring, to form a yielding abutment for the pinion and resist its telescopic movement into the transmission member, and a lock member in the driven clutch member limiting the projection of the pinion therefrom.

5. An engine starter drive as set forth in claim 3 including further, means for limiting the travel of the barrel member toward the engine gear, yielding means for returning the barrel member to idle position, and means for preventing the return of the barrel member to idle position during energization of the drive.

JAMES J. DIGBY.

REFERENCES CITED

The following references are of record in the file of this patent:

UNITED STATES PATENTS

| Number | Name | Date |
|---|---|---|
| 2,495,653 | Digby | Jan. 24, 1950 |